United States Patent
Lilly et al.

(10) Patent No.: US 9,454,486 B2
(45) Date of Patent: Sep. 27, 2016

(54) CACHE PRE-FETCH MERGE IN PENDING REQUEST BUFFER

(71) Applicant: Apple Inc., Cupertino, CA (US)

(72) Inventors: Brian P. Lilly, San Francisco, CA (US); Perumal R Subramoniam, San Jose, CA (US); Prashant Jain, San Jose, CA (US)

(73) Assignee: Apple Inc., Cupertino, CA (US)

( * ) Notice: Subject to any disclaimer, the term of this patent is extended or adjusted under 35 U.S.C. 154(b) by 297 days.

(21) Appl. No.: 13/940,525

(22) Filed: Jul. 12, 2013

(65) Prior Publication Data

US 2015/0019824 A1    Jan. 15, 2015

(51) Int. Cl.
*G06F 12/00* (2006.01)
*G06F 12/08* (2016.01)
*G06F 12/10* (2016.01)

(52) U.S. Cl.
CPC ....... *G06F 12/0862* (2013.01); *G06F 12/1027* (2013.01); *G06F 2212/6022* (2013.01); *G06F 2212/654* (2013.01)

(58) Field of Classification Search
CPC ........... G06F 12/1027; G06F 12/0862; G06F 2212/6022; G06F 2212/654; G06F 3/0613; G06F 3/0656; G06F 3/0671
See application file for complete search history.

(56) References Cited

U.S. PATENT DOCUMENTS

| | | | |
|---|---|---|---|
| 5,361,391 A | 11/1994 | Westberg | |
| 5,740,398 A | 4/1998 | Quattromani et al. | |
| 7,600,078 B1* | 10/2009 | Cen et al. | 711/137 |
| 2002/0144062 A1* | 10/2002 | Nakamura | G06F 9/30043 711/137 |
| 2006/0036807 A1* | 2/2006 | Watanabe et al. | 711/118 |
| 2009/0106499 A1* | 4/2009 | Aoki et al. | 711/137 |
| 2009/0307433 A1 | 12/2009 | Jones et al. | |
| 2012/0084532 A1* | 4/2012 | MaCkenna | G06F 12/0862 712/41 |

FOREIGN PATENT DOCUMENTS

EP    0442690 A2    8/1991

* cited by examiner

*Primary Examiner* — Kalpit Parikh
(74) *Attorney, Agent, or Firm* — Meyertons, Hood, Kivlin, Kowert & Goetzel, P.C.

(57) ABSTRACT

An apparatus for processing cache requests in a computing system is disclosed. The apparatus may include a pending request buffer and a control circuit. The pending request buffer may include a plurality of buffer entries. The control circuit may be coupled to the pending request buffer and may be configured to receive a request for a first cache line from a pre-fetch engine, and store the received request in an entry of the pending request buffer. The control circuit may be further configured to receive a request for a second cache line from a processor, and store the request received from the processor in the entry of the pending request buffer in response to a determination that the second cache line is the same as the first cache line.

15 Claims, 7 Drawing Sheets

CACHE PRE-FETCH MERGE IN PENDING REQUEST BUFFER

BACKGROUND

1. Technical Field

This invention relates to computing systems, and more particularly, to maintaining coherency among multiple cache memories within the computing system.

2. Description of the Related Art

Computing systems may include one or more systems-on-a-chip (SoC), which may integrate a number of different functions, such as, graphics processing, onto a single integrated circuit. With numerous functions included in a single integrated circuit, chip count may be kept low in mobile computing systems, such as tablets, for example, which may result in reduced assembly costs, and a smaller form factor for such mobile computing systems.

To implement the desired functions on an SoC, one or more processors may be employed. Each processor may include a memory system with multiple levels of caches for providing low latency access to program instructions and operands. With multiple processors accessing multiple caches as well as main memory, the issue of cache coherency may arise. For example, a given data producer, such as, e.g., one of processors, may write a copy of data in a cache, but the update to main memory's copy of the data may be delayed. In write-through caches, a write operation may be dispatched to memory in response to the write to the cache line, but the write is delayed in time. In a writeback cache, writes are made in the cache and not reflected in memory until the updated cache block is replaced in the cache (and is written back to main memory in response to the replacement).

Because the updates have not been made to main memory at the time the updates are made in cache, a given data consumer, such as, e.g., another processor, may read the copy of data in main memory and obtain "stale" data (data that has not yet been updated). A cached copy in a cache other than the one to which a data producer is coupled can also have stale data. Additionally, if multiple data producers are writing the same memory locations, different data consumers could observe the writes in different orders.

Cache coherence solves these problems by ensuring that various copies of the same data (from the same memory location) can be maintained while avoiding "stale data", and by establishing a "global" order of reads/writes to the memory locations by different producers/consumers. If a read follows a write in the global order, the data read reflects the write. Typically, caches will track a state of their copies according to the coherence scheme. For example, the popular Modified, Exclusive, Shared, Invalid (MESI) scheme includes a modified state (the copy is modified with respect to main memory and other copies); an exclusive state (the copy is the only copy other than main memory); a shared state (there may be one or more other copies besides the main memory copy); and the invalid state (the copy is not valid). The MOESI scheme adds an Owned state in which the cache is responsible for providing the data for a request (either by writing back to main memory before the data is provided to the requestor, or by directly providing the data to the requester), but there may be other copies in other caches. Maintaining cache coherency is increasingly challenging as various different types of memory requests referencing uncacheable and cacheable regions of the address space are processed by the processor(s).

SUMMARY OF THE EMBODIMENTS

Various embodiments of a circuit and method for processing cache requests in a computing system are disclosed. Broadly speaking, an apparatus and a method are contemplated in which cache requests are stored in a pending request buffer. The pending request buffer may include a plurality of buffer entries. A control circuit may be configured to receive a request for a first cache line from a pre-fetch engine, and store the request in an entry of the pending request buffer in response to determining that the requested cache line is not stored in a cache memory. The control circuit may also be configured to receive a request for a second cache line, and store the request for the second cache line in the previously used entry of the pending request buffer in response to determining that the second cache line is the same as the first cache line.

In one embodiment, the control circuit may be configured to select the request for the first cache line from the pre-fetch engine from a plurality of requests for a respective plurality of cache lines.

In a further embodiment, each entry of the plurality of buffer entries includes an address field, and one or more status bis.

BRIEF DESCRIPTION OF THE DRAWINGS

The following detailed description makes reference to the accompanying drawings, which are now briefly described.

Figure 1:
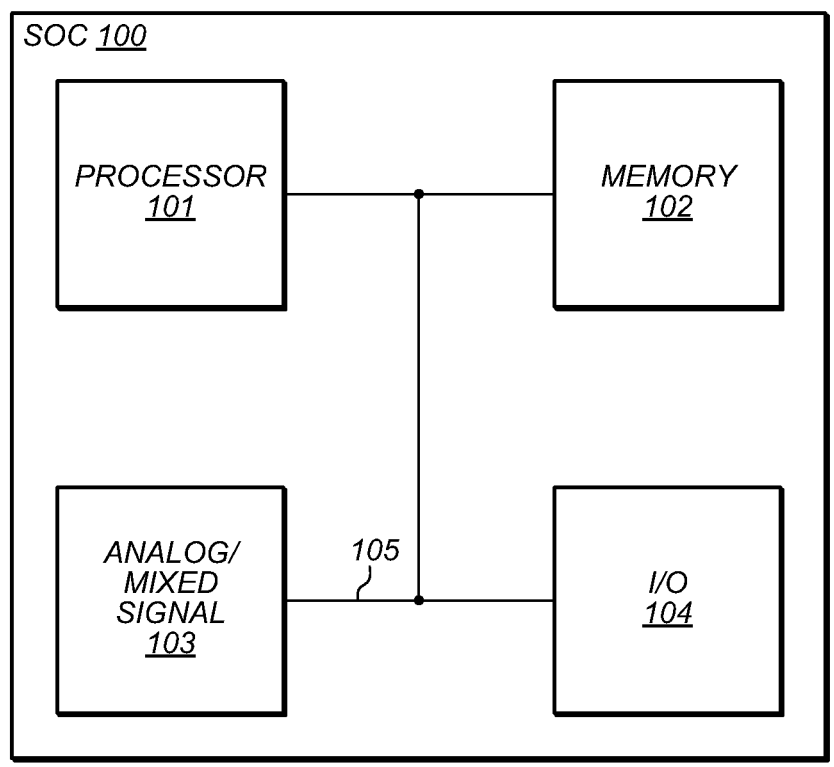
FIG. 1 illustrates an embodiment of a system on a chip.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component. More generally, the recitation of any element is expressly intended not to invoke 35 U.S.C. §112, paragraph six interpretation for that element unless the language "means for" or "step for" is specifically recited.

DETAILED DESCRIPTION OF EMBODIMENTS

To improve computational performance, a system-on-a-chip (SoC) may include multiple processors. Each processor may employ a local cache memory to provide rapid access to local copies of instructions and operands. In some cases, there may be multiple copies of an operand. For example, there may a copy of an operand in main memory in addition to a copy in each cache memory employed. When one of the copies of the operand is changed, the other copies must be updated as well. Maintaining consistency of data across the various memories is commonly referred to as maintaining "cache coherence."

Each cache memory may receive multiple requests from various sources, such as, e.g., a processor, a system bus, and the like. A cache unit (a functional collection of cache memoires and control logic) may need to arbitrate the various received requests. Some requests may be for the same cache line, in which case, the processing of one request may depend on the completion of processing another request. For example, a demand fetch request for a cache line may need to wait for the completion of a previously issued pre-fetch request for the same cache line. In such a case, the source of the demand fetch request may experience additional latency while waiting for the pre-fetch request to complete. The embodiments illustrated in the drawings and described below may provide techniques for processing demand fetch requests from a processor, while improving the latency of such a request.

System-on-a-Chip Overview

A block diagram of an SoC is illustrated in FIG. 1. In the illustrated embodiment, SoC 100 includes a processor 101 coupled to memory block 102, and analog/mixed-signal block 103, and I/O block 104 through internal bus 105. In various embodiments, SoC 100 may be configured for use in a mobile computing application such as, e.g., a tablet computer or cellular telephone. Transactions on internal bus 105 may be encoded according to one of various communication protocols. For example, transactions may be encoded using Peripheral Component Interconnect Express (PCIe®), or any other suitable communication protocol.

Memory block 102 may include any suitable type of memory such as a Dynamic Random Access Memory (DRAM), a Static Random Access Memory (SRAM), a Read-only Memory (ROM), Electrically Erasable Programmable Read-only Memory (EEPROM), a FLASH memory, Phase Change Memory (PCM), or a Ferroelectric Random Access Memory (FeRAM), for example. It is noted that in the embodiment of an SoC illustrated in FIG. 1, a single memory block is depicted. In other embodiments, any suitable number of memory blocks may be employed.

As described in more detail below, processor 101 may, in various embodiments, be representative of a general-purpose processor that performs computational operations. For example, processor 101 may be a central processing unit (CPU) such as a microprocessor, a microcontroller, an application-specific integrated circuit (ASIC), or a field-programmable gate array (FPGA).

Analog/mixed-signal block 103 may include a variety of circuits including, for example, a crystal oscillator, a phase-locked loop (PLL), an analog-to-digital converter (ADC), and a digital-to-analog converter (DAC) (all not shown). In other embodiments, analog/mixed-signal block 103 may be configured to perform power management tasks with the inclusion of on-chip power supplies and voltage regulators. Analog/mixed-signal block 103 may also include, in some embodiments, radio frequency (RF) circuits that may be configured for operation with cellular telephone networks.

I/O block 104 may be configured to coordinate data transfer between SoC 100 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, I/O block 104 may be configured to implement a version of Universal Serial Bus (USB) protocol or IEEE 1394 (Firewire®) protocol.

I/O block 104 may also be configured to coordinate data transfer between SoC 100 and one or more devices (e.g., other computer systems or SoCs) coupled to SoC 100 via a network. In one embodiment, I/O block 104 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, I/O block 104 may be configured to implement multiple discrete network interface ports.

Each of the functional blocks included in SoC 100 may be included in separate power and/or clock domains. In some embodiments, a functional block may be further divided into smaller power and/or clock domains. Each power and/or clock domain may, in some embodiments, be separately controlled thereby selectively deactivating (either by stopping a clock signal or disconnecting the power) individual functional blocks or portions thereof.

Figure 2:
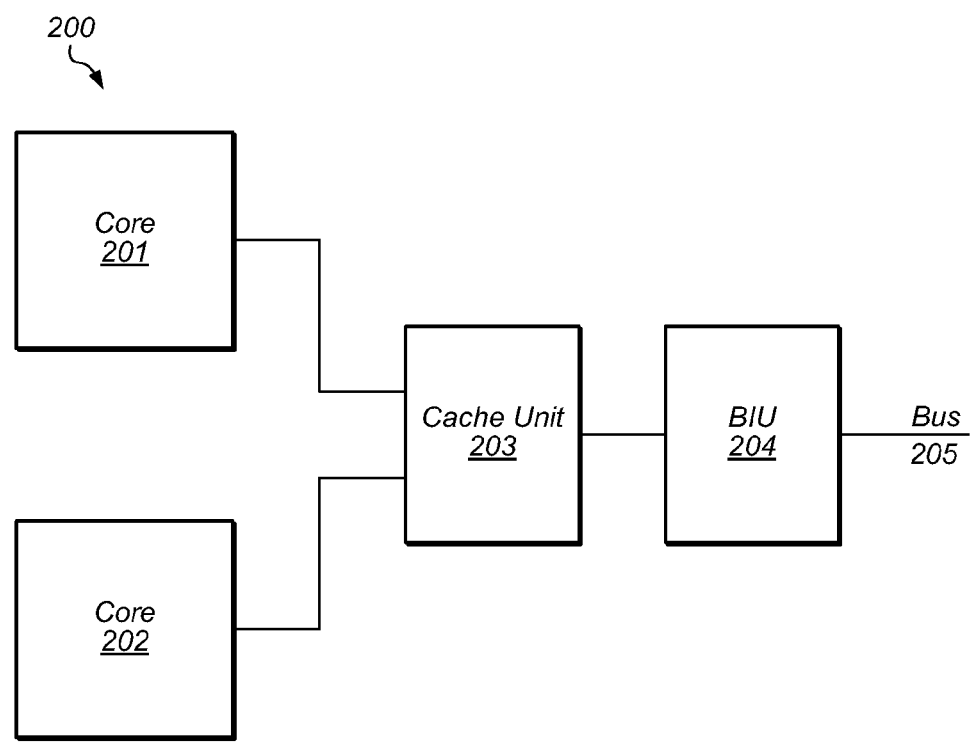
FIG. 2 illustrates another embodiment of a system on a chip.

Another embodiment of an SoC is depicted in FIG. 2. In the illustrated embodiment SoC 200 includes processor cores 201 and 202, cache unit 203, and bus interface unit (BIU) 204. Processor cores 201 and 202 are both coupled to cache unit 203, which is, in turn, coupled to BIU 204. BIU 204 is further coupled to bus 205. In some embodiments bus 205 may correspond to bus 105 of SoC 100 as illustrated in FIG. 1.

Each of processor cores 201 and 202 may, in various embodiments, be representative of a general-purpose processor that performs computational operations. For example, processor cores 201 and 202 may each be a microprocessor, a microcontroller, an ASIC, or a FPGA. In some embodiments, processor cores 201 and 202 may each include an instruction and data cache memory. Processors cores 201 and 202 may, in other embodiments, store (or "cache") data and/or instructions in cache unit 203.

Cache unit 203 may be configured to support cache requests from processor core 201 and processor core 202. In various embodiments, cache unit 203 may service requests from each processor core and return fill data or appropriate acknowledgement to the various requests. Additionally, cache unit 203 may service snoop requests from other functional blocks coupled to bus 205 (also referred to herein as "coherent agents"), maintain coherency across processor core 201 and processor core 202, and handle cache and Translation Lookaside Buffer (TLB) maintenance operations.

In various embodiments, cache unit 203 may include one or more memories, each of which may be configured to store cache data from processor cores 201 and 202. Cache unit 203 may also include interface logic configured to communication with processor cores 201 and 202 as well as BIU 204. In some embodiments, cache unit 203 may include control logic configured to implement the functions described above. The control logic may, in various embodiments, be implemented using a "pipeline" consisting of multiple stages of logic circuits.

BIU 204 may be configured to connect cache unit 203 to bus 205. In some embodiments, BIU 204 may arbitrate between various outgoing requests from cache unit 203 to be sent to other functional blocks (not shown) coupled to bus 205. BIU 204 may, in other embodiments, be configured to route incoming requests from the other functional blocks the request's intended destinations.

BIU 204 may include multiple level shift circuits in addition to asynchronous First-In First-Out (FIFO) buffers that may be configured to receive source synchronous transactions from bus 205. Clock divider circuits may also be included to allow BIU 204 to send source synchronous transactions on bus 205.

It is noted that the embodiment illustrated in FIG. 2 is merely an example. In other embodiments, different numbers of functional blocks and different configurations of functional blocks are possible and contemplated.

Processor Overview

Figure 3:
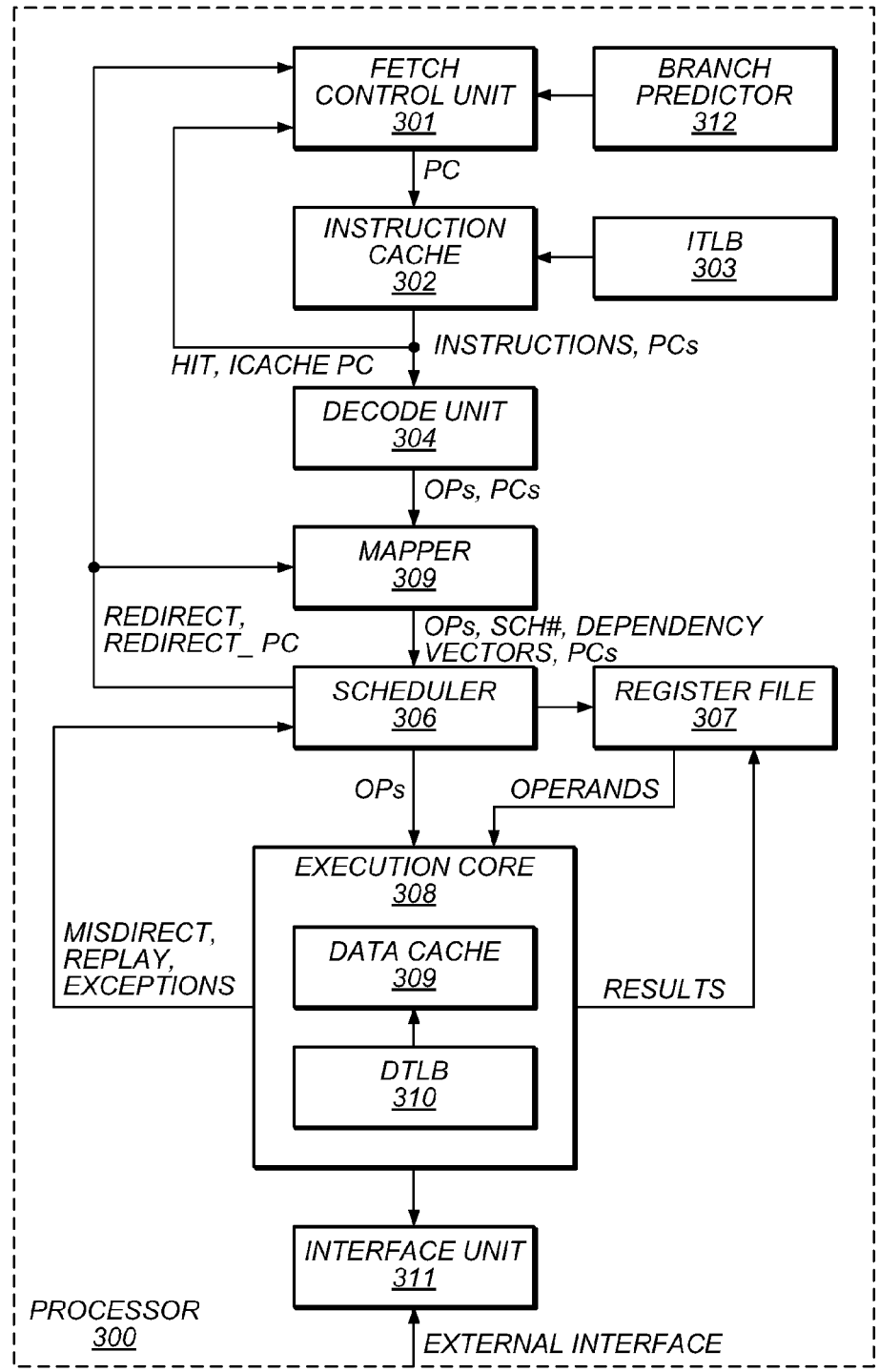
FIG. 3 illustrates an embodiment of a processor.

Turning now to FIG. 3, a block diagram of an embodiment of a processor 300 is shown. In the illustrated embodiment, the processor 300 includes a fetch control unit 301, an instruction cache 302, a decode unit 304, a mapper 309, a scheduler 306, a register file 307, an execution core 308, and an interface unit 311. The fetch control unit 301 is coupled to provide a program counter address (PC) for fetching from the instruction cache 302. The instruction cache 302 is coupled to provide instructions (with PCs) to the decode unit 304, which is coupled to provide decoded instruction operations (ops, again with PCs) to the mapper 309. The instruction cache 302 is further configured to provide a hit indication and an ICache PC to the fetch control unit 301. The mapper 309 is coupled to provide ops, a scheduler number (SCH#), source operand numbers (SO#s), one or more dependency vectors, and PCs to the scheduler 306. The scheduler 306 is coupled to receive replay, mispredict, and exception indications from the execution core 308, is coupled to provide a redirect indication and redirect PC to the fetch control unit 301 and the mapper 309, is coupled to the register file 307, and is coupled to provide ops for execution to the execution core 308. The register file is coupled to provide operands to the execution core 308, and is coupled to receive results to be written to the register file 307 from the execution core 308. The execution core 308 is coupled to the interface unit 311, which is further coupled to an external interface of the processor 300.

Fetch control unit 301 may be configured to generate fetch PCs for instruction cache 302. In some embodiments, fetch control unit 301 may include one or more types of branch predictors 312. For example, fetch control unit 301 may include indirect branch target predictors configured to predict the target address for indirect branch instructions, conditional branch predictors configured to predict the outcome of conditional branches, and/or any other suitable type of branch predictor. During operation, fetch control unit 301 may generate a fetch PC based on the output of a selected branch predictor. If the prediction later turns out to be incorrect, fetch control unit 301 may be redirected to fetch from a different address. When generating a fetch PC, in the absence of a nonsequential branch target (i.e., a branch or other redirection to a nonsequential address, whether speculative or non-speculative), fetch control unit 301 may generate a fetch PC as a sequential function of a current PC value. For example, depending on how many bytes are fetched from instruction cache 302 at a given time, fetch control unit 301 may generate a sequential fetch PC by adding a known offset to a current PC value.

The instruction cache 302 may be a cache memory for storing instructions to be executed by the processor 300. The instruction cache 302 may have any capacity and construction (e.g. direct mapped, set associative, fully associative, etc.). The instruction cache 302 may have any cache line size. For example, 64 byte cache lines may be implemented in an embodiment. Other embodiments may use larger or smaller cache line sizes. In response to a given PC from the fetch control unit 301, the instruction cache 302 may output up to a maximum number of instructions. It is contemplated that processor 200 may implement any suitable instruction set architecture (ISA), such as, e.g., the ARM™, PowerPC™, or x86 ISAs, or combinations thereof.

In some embodiments, processor 300 may implement an address translation scheme in which one or more virtual address spaces are made visible to executing software. Memory accesses within the virtual address space are translated to a physical address space corresponding to the actual physical memory available to the system, for example using a set of page tables, segments, or other virtual memory translation schemes. In embodiments that employ address translation, the instruction cache 302 may be partially or completely addressed using physical address bits rather than virtual address bits. For example, instruction cache 302 may use virtual address bits for cache indexing and physical address bits for cache tags.

In order to avoid the cost of performing a full memory translation when performing a cache access, processor 300 may store a set of recent and/or frequently-used virtual-to-physical address translations in a translation lookaside buffer (TLB), such as Instruction TLB (ITLB) 303. During operation, ITLB 303 (which may be implemented as a cache, as a content addressable memory (CAM), or using any other suitable circuit structure) may receive virtual address information and determine whether a valid translation is present. If so, ITLB 303 may provide the corresponding physical address bits to instruction cache 302. If not, ITLB 303 may cause the translation to be determined, for example by raising a virtual memory exception.

The decode unit 304 may generally be configured to decode the instructions into instruction operations (ops). Generally, an instruction operation may be an operation that the hardware included in the execution core 308 is capable of executing. Each instruction may translate to one or more instruction operations which, when executed, result in the operation(s) defined for that instruction being performed according to the instruction set architecture implemented by the processor 300. In some embodiments, each instruction may decode into a single instruction operation. The decode unit 304 may be configured to identify the type of instruction, source operands, etc., and the decoded instruction operation may include the instruction along with some of the decode information. In other embodiments in which each instruction translates to a single op, each op may simply be the corresponding instruction or a portion thereof (e.g. the opcode field or fields of the instruction). In some embodiments in which there is a one-to-one correspondence between instructions and ops, the decode unit 304 and mapper 305 may be combined and/or the decode and mapping operations may occur in one clock cycle. In other embodiments, some instructions may decode into multiple instruction operations. In some embodiments, the decode unit 304 may include any combination of circuitry and/or microcoding in order to generate ops for instructions. For example, relatively simple op generations (e.g. one or two ops per instruction) may be handled in hardware while more extensive op generations (e.g. more than three ops for an instruction) may be handled in microcode.

Ops generated by the decode unit 304 may be provided to the mapper 305. The mapper 305 may implement register renaming to map source register addresses from the ops to the source operand numbers (SO#s) identifying the renamed source registers. Additionally, the mapper 305 may be configured to assign a scheduler entry to store each op, identified by the SCH#. In an embodiment, the SCH# may also be configured to identify the rename register assigned to the destination of the op. In other embodiments, the mapper 305 may be configured to assign a separate destination register number. Additionally, the mapper 305 may be configured to generate dependency vectors for the op. The dependency vectors may identify the ops on which a given op is dependent. In an embodiment, dependencies are indicated by the SCH# of the corresponding ops, and the dependency vector bit positions may correspond to SCH#s. In other embodiments, dependencies may be recorded based on register numbers and the dependency vector bit positions may correspond to the register numbers.

The mapper 305 may provide the ops, along with SCH#, SO#s, PCs, and dependency vectors for each op to the scheduler 306. The scheduler 306 may be configured to store the ops in the scheduler entries identified by the respective SCH#s, along with the SO#s and PCs. The scheduler may be configured to store the dependency vectors in dependency arrays that evaluate which ops are eligible for scheduling. The scheduler 306 may be configured to schedule the ops for execution in the execution core 308. When an op is scheduled, the scheduler 306 may be configured to read its source operands from the register file 307 and the source operands may be provided to the execution core 308. The execution core 308 may be configured to return the results of ops that update registers to the register file 307. In some cases, the execution core 308 may forward a result that is to be written to the register file 307 in place of the value read from the register file 307 (e.g. in the case of back to back scheduling of dependent ops).

The execution core 308 may also be configured to detect various events during execution of ops that may be reported to the scheduler. Branch ops may be mispredicted, and some load/store ops may be replayed (e.g. for address-based conflicts of data being written/read). Various exceptions may be detected (e.g. protection exceptions for memory accesses or for privileged instructions being executed in non-privileged mode, exceptions for no address translation, etc.). The exceptions may cause a corresponding exception handling routine to be executed.

The execution core 308 may be configured to execute predicted branch ops, and may receive the predicted target address that was originally provided to the fetch control unit 301. The execution core 308 may be configured to calculate the target address from the operands of the branch op, and to compare the calculated target address to the predicted target address to detect correct prediction or misprediction. The execution core 308 may also evaluate any other prediction made with respect to the branch op, such as a prediction of the branch op's direction. If a misprediction is detected, execution core 308 may signal that fetch control unit 301 should be redirected to the correct fetch target. Other units, such as the scheduler 306, the mapper 305, and the decode unit 304 may flush pending ops/instructions from the speculative instruction stream that are subsequent to or dependent upon the mispredicted branch.

The execution core may include a data cache 309, which may be a cache memory for storing data to be processed by the processor 300. Like the instruction cache 302, the data cache 309 may have any suitable capacity, construction, or line size (e.g. direct mapped, set associative, fully associative, etc.). Moreover, the data cache 309 may differ from the instruction cache 302 in any of these details. As with instruction cache 302, in some embodiments, data cache 309 may be partially or entirely addressed using physical address bits. Correspondingly, a data TLB (DTLB) 310 may be provided to cache virtual-to-physical address translations for use in accessing the data cache 309 in a manner similar to that described above with respect to ITLB 303. It is noted that although ITLB 303 and DTLB 310 may perform similar functions, in various embodiments they may be implemented differently. For example, they may store different numbers of translations and/or different translation information.

The register file 307 may generally include any set of registers usable to store operands and results of ops executed in the processor 300. In some embodiments, the register file 307 may include a set of physical registers and the mapper 305 may be configured to map the logical registers to the physical registers. The logical registers may include both architected registers specified by the instruction set architecture implemented by the processor 300 and temporary registers that may be used as destinations of ops for temporary results (and sources of subsequent ops as well). In other embodiments, the register file 307 may include an architected register set containing the committed state of the logical registers and a speculative register set containing speculative register state.

The interface unit 311 may generally include the circuitry for interfacing the processor 300 to other devices on the external interface. The external interface may include any type of interconnect (e.g. bus, packet, etc.). The external interface may be an on-chip interconnect, if the processor 300 is integrated with one or more other components (e.g. a system on a chip configuration). The external interface may be on off-chip interconnect to external circuitry, if the processor 300 is not integrated with other components. In various embodiments, the processor 300 may implement any instruction set architecture.

Cache Unit Architecture and Fetch Request Processing

Figure 4:
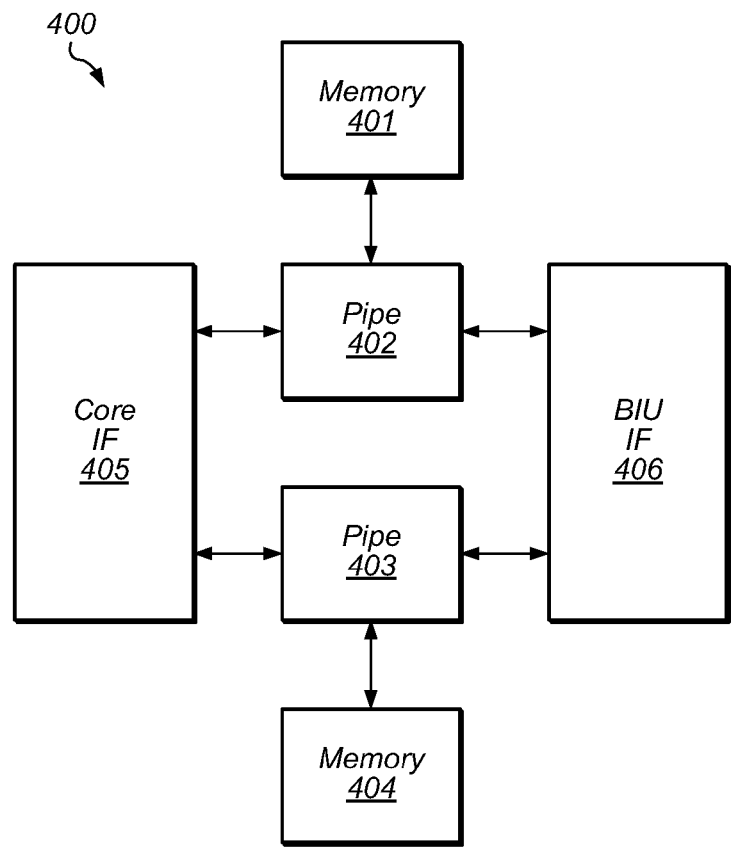
FIG. 4 illustrates an embodiment of a cache unit.

An embodiment of a cache unit is illustrated in FIG. 4. In the illustrated embodiment, cache unit 400 includes memories 401 and 404, pipeline logic blocks 402 and 403, core interface 405, and BIU interface 406. Memory 401 is coupled to pipeline logic block 402, which is, in turn, coupled to core interface 405 and BIU interface 406. Memory 404 is coupled to pipeline logic block 403, which is, in turn, coupled to core interface 405 and BIU interface 406.

Each of memories 401 and 404 may be designed in accordance with one of various design styles, such as, e.g., a Static Random Access Memory (SRAM), or another suitable memory type. In some embodiments, memory 401 and memory 404 may include multiple array (also referred to herein as "bank") where each bank may be independently accessed (either a read access or a write access). In various embodiments, each of memories 401 and 404 may be configured to store all or part of a cache line.

Core interface 405 may, in various embodiments, be configured to interface between pipeline logic blocks 402 and 403 and respective processor cores, such as, e.g., processor cores 201 and 202 of SoC 200 as illustrated in FIG. 2. In some embodiments, core interface 405 may receive requests from processor cores, decode each received request, and send the decoded request to the appropriate pipeline logic block. Core interface 405 may also include one or more core request queues (CRQs), each of which may be configured to store requests received from a processor core that could not be sent to a pipeline logic block. In various embodiments, core interface 405 may include an arbitration circuit. The arbitration circuit may be configured to grant access to pipeline logic blocks 402 and 403 from external processor cores as well as between different structures within each of pipeline logic block 402 and 403. Core interface 405 may, in various embodiments, include pre-fetch and flush logic circuits (also referred to herein as "engines").

Each of pipeline logic blocks 402 and 403 may be configured to receive read, write, and snoop requests after arbitration. In various embodiments, each pipeline logic block may include tag arrays, and circuitry configured to interface to memories 401 and 404. In some embodiments, each of pipeline logic blocks 402 and 403 may include a pending request buffer that may be configured to hold requests that may not be completed in a single pass and that require multiple passes through the pipeline logic to complete. Received instructions may be stored in the pending request buffer until a determination is made that a read of memory 401 or memory 404 was completed with no errors. In various embodiments, a pending request buffer may include multiple buffers. Each buffer may include any suitable number of entries, where each entry may be configured to store different information, such as, e.g., data or address information. A scoreboard circuit may be used, in some embodiments, to track the state of various entries within the pending request buffer.

BIU interface 406 may be configured to interface requests between cache unit 400 and a bus interface unit, such as, BIU 204 as illustrated in FIG. 2. In some embodiments, BIU interface 406 may include an arbitration circuit configured arbitrate requests received from various coherent agents to either pipeline logic block 402 or pipeline logic block 403.

It is noted that the embodiment illustrated in FIG. 4 is merely an example. In other embodiments, different functional blocks and different arrangements of functional blocks are possible and contemplated.

Figure 5:
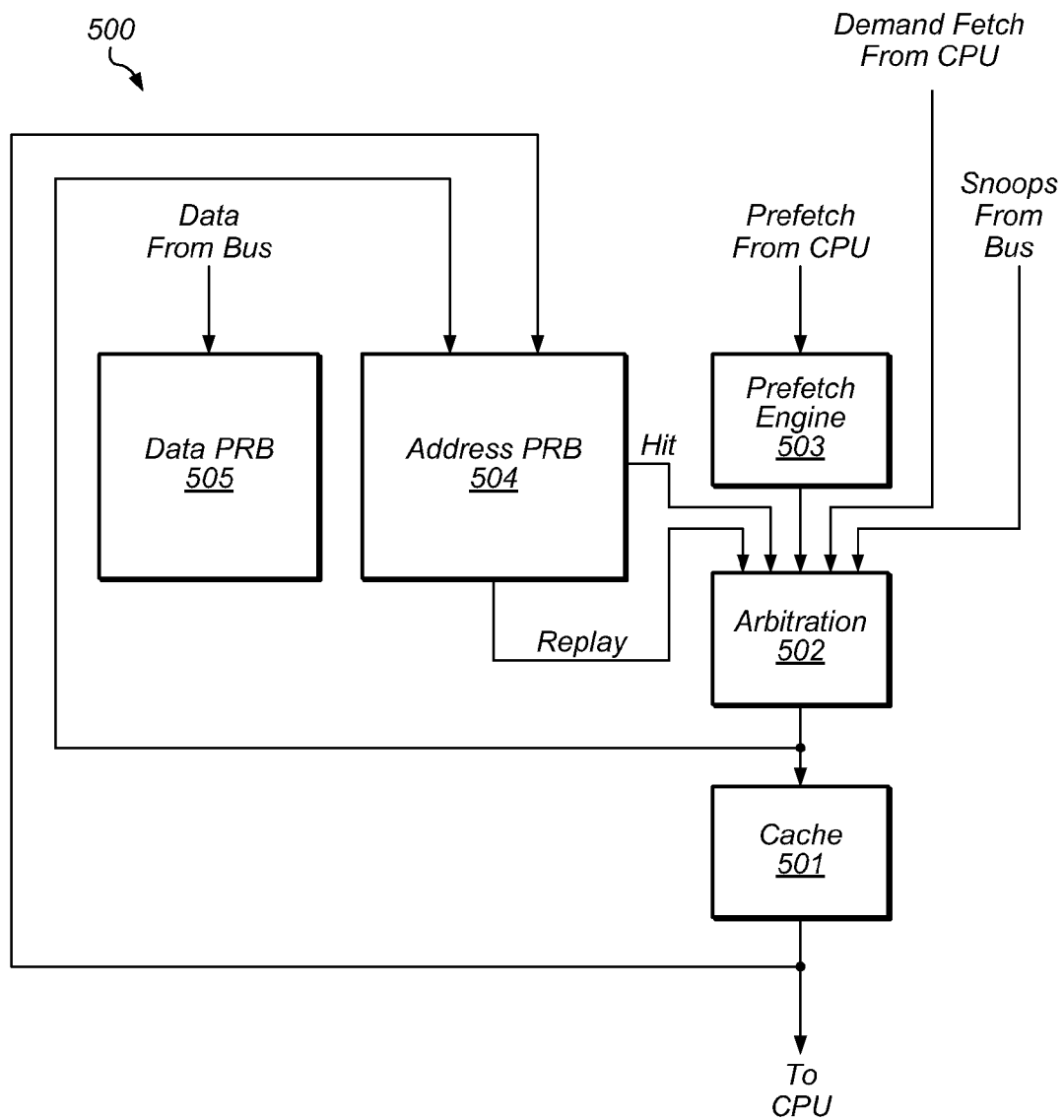
FIG. 5 illustrates another embodiment of a cache unit.

Turning to FIG. 5, another embodiment of a cache unit is illustrated. In the illustrated embodiment, cache unit 500 includes cache memory 501, arbitration circuit 502, pre-fetch engine 503, address Pending Request Buffer (PRB) 504, and data PRB 505. Arbitration circuit 502 is coupled to receive demand fetches and snoop fetches, as well as being coupled to pre-fetch engine 503 and address PRB 504. Cache memory 501 is coupled to arbitration circuit 502 in addition to address PRB 504.

Cache memory 501 may, in various embodiments, correspond to either memory 401 or memory 404 of cache unit 400 as illustrated in FIG. 4. Cache memory 501 may be implemented according to one of various design styles, such as, e.g., SRAM, or any other suitable memory design style.

In some embodiments, cache memory 501 may include multiple banks, and cache memory 501 may be configured to allow simultaneous access (either read or write) to at least two banks. Arbitration circuit 502 may, in other embodiments, may schedule requests to prevent bank conflicts.

Arbitration circuit 502 may be configured to select between requests from multiple sources, including pre-fetch engine 503, a demand fetch from a processor core, such as, processor core 201 as illustrated in FIG. 2, snoop requests from coherent agents coupled to a bus, such as, e.g., bus 205 as illustrated in FIG. 2, or a hit or replay request from address PRB 504. In some embodiments, arbitration circuit 502 may employ a weighted round-robin, or any other suitable arbitration scheme, to select from the above referenced request sources. In other embodiments, address multiplexing necessary to access cache memory 501 may also be performed by arbitration circuit 502.

Pre-fetch engine 503 may, in various embodiments, be configured to generate requests to load data at address in main memory into cache memory 501. For example, in response to a cache miss (a request for a cache line from a processor core that was not present in cache memory), pre-fetch engine 503 may generate requests to load a pre-determined number of lines into cache memory 501. The lines may be in sequence from the address that generated the miss. Pre-fetch engine 503 may be implemented in one of various design styles, such as, e.g., a dedicated processor, a general purpose processor configured to execute program instructions, or any other suitable processing unit.

Address PRB 504 may include multiple entries, where each entry is configured to store the address of the request memory location in an address field of the entry. Each entry may also include one or more status bits (also referred to herein as a "scoreboard") that may be employed to track the state of an entry. For example, data bits indicative of the source of a request, any dependencies the request may have, and if the request is the result of a pre-fetch. In some embodiments, address PRB 504 may be implemented as a Content-Addressable Memory (CAM), or any other suitable memory circuit that allows for the comparison of address information stored in the individual entries to an externally supplied address.

Data PRB 505 may include the same number of entries as address PRB 504, and each entry in data PRB 505 may correspond to a respective entry in address PRB 504. Each entry in data PRB 505 may be configured to hold a cache block that is waiting to be stored (also referred to as "filled") into cache memory 501. In some embodiments, data PRB 505 may include multiple write ports in addition to a read port. For example, in various embodiments, one write port may be configured to receive data from a coherent agent through a BIU, such as, e.g., BIU 204 as illustrated in FIG. 2, while another write port may be configured to receive writeback or snoop data from a processor core, such as, e.g., processor core 201, as illustrated in FIG. 2.

It is noted that the embodiment illustrated in FIG. 5 is merely an example. Although two types of pending request buffers are described, i.e., address and data, in other embodiments, additional buffer types may be employed.

Figure 6:
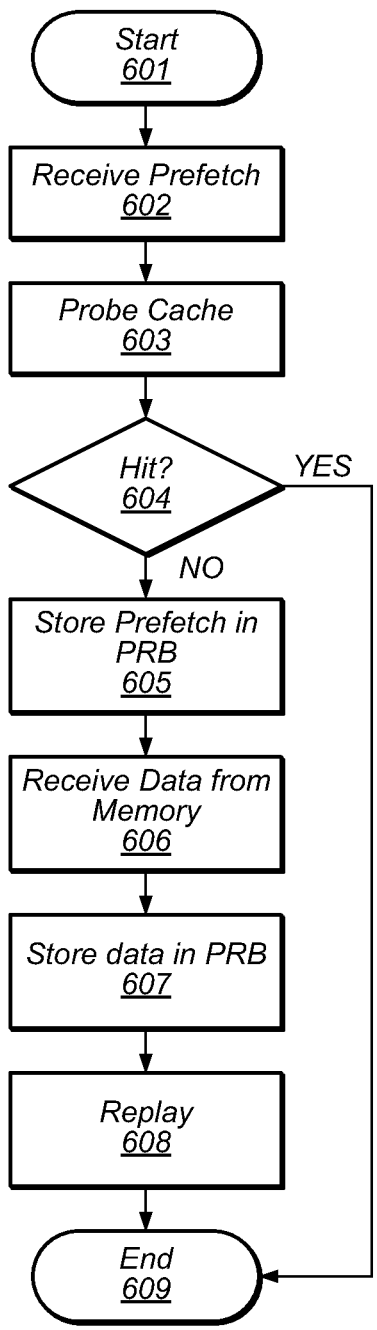
FIG. 6 illustrates a flowchart depicting an embodiment of a method for processing a pre-fetch request.

A flowchart depicted an embodiment of a method for operating a cache unit, such as cache unit 500, is illustrated in FIG. 6. Referring collectively to cache unit 500 as illustrated in FIG. 5, and the flowchart depicted in FIG. 6, the method begins in block 601. A pre-fetch request may then be received by arbitration circuit 502 by pre-fetch engine 503 (block 602). In some embodiments, the pre-fetch request may be the result of a previous cache miss.

Once the pre-fetch request has been received and selected by arbitration circuit 603, cache memory 501 may then be probed to determine if the requested cache line is stored in cache memory 501 (block 603). In some embodiments, cache memory 501 may be checked in a sequential fashion, while, in other embodiments, cache memory 501 may employ CAM data storage cells allowing the simultaneous comparison of multiple entries included in cache memory 501.

The method may then depend on if there was a "hit," i.e., the requested cache line was present in cache memory 501 (block 604). When the requested line was determined to be stored in cache memory 501, the method may then conclude in block 609. When the requested line was determined to not be stored in cache memory 501, the pre-fetch request may then be stored in address PRB 605 (block 605). In some embodiments, one or more status bits may be set indicating the request is a pre-fetch request. Additional status bits may be set to indicate that the source of the request is pre-fetch engine 503. In other embodiments, status bits indicating any dependencies the request may have, may be cleared, i.e., set to a value indicating that the request has no dependencies.

Once the request has been stored in address PRB, the request may be completed and the requested data may be received from main memory via a communication bus, such as, e.g., bus 205 as illustrated in FIG. 2 (block 606). Once the data has been received by cache unit 500, the received data may then be stored in data PRB 505 (block 607). In some embodiments, the data may be stored in an entry in data PRB 505 that corresponds to the request stored in address PRB 504.

With the received data stored in data PRB 505, the original request may be replayed in order to store the requested cache line into cache memory 501 (block 608). Once the requested cache line has been stored in cache memory 501, the method may then conclude in block 608.

Although the operations illustrated in FIG. 6 are depicted as being performed in a sequential matter, in other embodiments, one or more of the operations may be performed in parallel.

Figure 7:
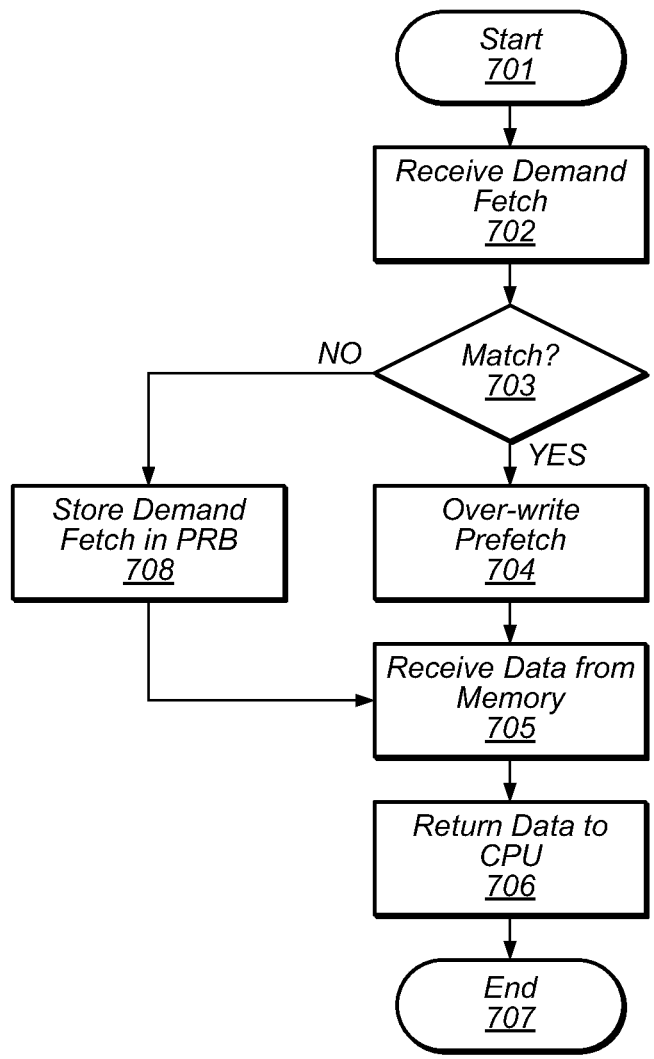
FIG. 7 illustrates a flowchart depicting an embodiment of a method for processing a demand fetch.

Turning to FIG. 7, a flowchart depicting another method of operating a cache unit, such as cache unit 500, is illustrated. Referring collectively to the cache unit 500 as illustrated in FIG. 5, and the flowchart depicted in FIG. 7, the method begins in block 701. A demand fetch may then be received by cache unit 500 from a processor core, such as, e.g., processor core 201 as illustrated in FIG. 2 (block 702). Once the demand fetch has been received and selected by arbitration circuit 502, the method may then depend on whether the cache line requested in the demand fetch matches a pre-fetch entry in address PRB 504 (block 703). In some embodiments, each entry in address PRB 504 may be checked in a sequential fashion, while, in other embodiments, address PRB 504 may employ CAM data storage cells, and the entries of address PRB 504 may be checked in parallel.

When the cache line requested in the received demand fetch does not match any pre-fetch entries in address PRB 504, the demand fetch may be then be stored in address PRB 504 (block 708). In some embodiments, one or more status bits associated with the entry in address PRB 504 where the demand fetch is stored may be set indicating that a processor core, such as processor core 201 as illustrated in FIG. 2, is the source of the demand fetch. In the case where the demand fetch has dependencies, additional status bits may be set indicating the dependencies.

Once the demand fetch request has been stored in address PRB, the request may be completed and the requested data may be received from main memory via a communication bus, such as, e.g., bus 205 as illustrated in FIG. 2 (block 705). Once the data has been received by cache unit 500, the received data may then be sent to the requesting processor, such as processor core 201 as illustrated in FIG. 2 (block 706). In some embodiments, the request may also be replayed as described above in reference to 608 of the method depicted in FIG. 6, so store the received data in cache memory 501. After the data has been sent to the requesting processor, the method may conclude in block 707.

When the cache line requested in the received demand fetch matches a pre-fetch entry in address PRB 504, the matching pre-fetch entry may then be over-written by the received demand fetch (block 704). In various embodiments, one or more status bits of the matching pre-fetch entry indicating the request is a pre-fetch request may be reset. Additional status bits associated with the entry of the matched pre-fetch request may be set to indicate that the source of the request is a processor, such as, e.g. processor core 201 as illustrated in FIG. 2. In the event of another demand fetch being received requesting the same cache line, the dependency status bits of the newly received demand fetch may be set to indicate that the newly received request is dependent upon the now over-written pre-fetch entry. In some embodiments, by over-writing the matching pre-fetch entry in PRB 504, the latency of the received demand fetch may be reduced, thereby improving system performance.

Once the matching pre-fetch has been over-written, the method proceeds as described above from block 705. It is noted that the method illustrated in FIG. 7 is merely an example. In other embodiments, different operations and different orders of operations are possible and contemplated.

Numerous variations and modifications will become apparent to those skilled in the art once the above disclosure is fully appreciated. It is intended that the following claims be interpreted to embrace all such variations and modifications.

What is claimed is:

1. An apparatus, comprising:
a first pending request buffer, wherein the first pending request buffer includes a first plurality of buffer entries;
a second pending request buffer, wherein the second pending request buffer includes a second plurality of buffer entries; and
a control circuit coupled to the first and second pending request buffers, wherein the control circuit is configured to:
receive a first request for a first cache line from a pre-fetch engine;
store the first request received from the pre-fetch engine in a first buffer entry of the first plurality of buffer entries in response to a determination that the first cache line is not stored in a cache memory;
receive data for the first cache line;
store the data for the first cache line in a second buffer entry in the second plurality of buffer entries;
receive a second request for a second cache line from a processor;
store the second request received from the processor in the first buffer entry of the first plurality of buffer entries in response to a determination that the second cache line is the same as the first cache line; and
replay the first request using the data for the first cache line stored in the second buffer entry;

wherein to store the first request for the first cache line, the control circuit is further configured to set at least one status bit of a buffer entry of the first or second plurality of buffer entries to indicate the request is a pre-fetch request.

2. The apparatus of claim 1, wherein to receive the request for the first cache line from the pre-fetch engine, the control circuit is further configured to select the request for the first cache line from a plurality of requests for a respective plurality of cache lines.

3. The apparatus of claim 1, wherein each buffer entry of the first and second plurality of buffer entries includes an address field.

4. The apparatus of claim 3, wherein the received request for the first cache line includes address information.

5. The apparatus of claim 4, wherein to store the received request for the first cache line, the control circuit is further configured to store the address information in the address field of a buffer entry of the first or second plurality of buffer entries.

6. The apparatus of claim 1, wherein the pending request buffer comprises a content addressable memory.

7. A method, comprising:
receiving a pre-fetch request for a first cache line;
storing the pre-fetch request into a location within a first buffer dependent upon a determination that the requested cache line is not stored in a cache memory;
receiving a demand request from a processor for a second cache line; and
storing the demand request into the location within the first buffer in response to a determination that the second cache line is the same as the first cache line;
receiving data in response to the pre-fetch request;
storing the data in a second buffer; and
replaying the pre-fetch request using the data stored in the second buffer; wherein storing the pre-fetch request into the location within the first buffer includes setting a data bit at the location within the first buffer, wherein the data bit is indicative of a pre-fetch request.

8. The method of claim 7, wherein receiving the pre-fetch request comprises arbitrating between the pre-fetch request and one or more demand fetches.

9. The method of claim 7, wherein the pre-fetch request includes an address.

10. The method of claim 9, wherein storing the pre-fetch request into the location within the first buffer comprises storing the address into an address field at the location within the first buffer.

11. The method of claim 7, wherein storing the pre-fetch request into the location within the first buffer comprises setting a source tag at the location within the first buffer to a value, wherein the value is indicates a pre-fetch engine as an originator.

12. The method of claim 11, wherein storing the demand request into the location within the first buffer comprises setting the source tag at the location within the first buffer to another value, wherein the another value indicates a processor as the originator.

13. A system, comprising:
a memory;
one or more processors; and
a cache unit coupled to the one or more processors and the memory, wherein the cache unit is configured to:
receive a request for a first cache line from a pre-fetch engine;
store the request received from the pre-fetch engine in a entry of an address pending request buffer responsive to a determination that the first cache line is not stored in a cache memory;
receive a request for a second cache line from a given one of the one or more processors;
store the request received from the given one of the one or more processors in the entry of the address pending request buffer responsive to a determination that the second cache line is the same as the first cache line;
receive data corresponding the first cache line from the memory;
store the data received from the memory in a data pending request buffer; and
replay the request for the first cache line using the data stored in the data pending request buffer;
wherein to store the request received from the pre-fetch engine, the cache unit is further configured to set a status bit associated with the entry of the address pending request buffer to indicate the received request is a pre-fetch request.

14. The system of claim 13, to receive the request for the first cache line from the pre-fetch engine, the cache unit is further configured to select the request for the first cache line from a plurality of requests for a respective plurality of cache lines.

15. The system of claim 13, wherein the cache unit is configured to receive data corresponding the first cache line from the memory, and store the data received from the memory in the cache memory.

* * * * *